United States Patent
Womack et al.

(10) Patent No.: US 9,347,688 B2
(45) Date of Patent: May 24, 2016

(54) TRACKING SOLAR MIRROR SYSTEM

(75) Inventors: Thomas Joseph Womack, Albuquerque, NM (US); Richard Hiram Womack, Albuquerque, NM (US)

(73) Assignee: Rio Grande Micro Corp., Albuquerque, NM (US)

( * ) Notice: Subject to any disclaimer, the term of this patent is extended or adjusted under 35 U.S.C. 154(b) by 977 days.

(21) Appl. No.: 13/445,795

(22) Filed: Apr. 12, 2012

(65) Prior Publication Data

US 2013/0269680 A1    Oct. 17, 2013

(51) Int. Cl.
| | |
|---|---|
| *F24J 2/00* | (2014.01) |
| *F24J 2/38* | (2014.01) |
| *F24J 2/54* | (2006.01) |
| *G02B 7/182* | (2006.01) |
| *F24J 2/12* | (2006.01) |
| *F24J 2/16* | (2006.01) |

(52) U.S. Cl.
CPC *F24J 2/38* (2013.01); *F24J 2/5417* (2013.01); *G02B 7/1827* (2013.01); *F24J 2/12* (2013.01); *F24J 2/16* (2013.01); *F24J 2002/5455* (2013.01); *F24J 2002/5468* (2013.01); *Y02E 10/47* (2013.01)

(58) Field of Classification Search
CPC .................................................... F24J 2/5417
USPC .................................. 126/696, 600; 359/853
See application file for complete search history.

(56) References Cited

U.S. PATENT DOCUMENTS 4,832,002 A * 5/1989 Medina ......................... 126/577

FOREIGN PATENT DOCUMENTS

| JP | 2002-195824 A |   | 7/2002 |
| JP | 2002195824 A | * | 7/2002 |

OTHER PUBLICATIONS

Preliminary Report on Patentability, PCT/US2013/032812, dated Oct. 23, 2014.
International Search Report, PCT/US2013/032812, Jun. 26, 2013.

* cited by examiner

*Primary Examiner* — Gregory Huson
*Assistant Examiner* — Aaron Heyamoto
(74) *Attorney, Agent, or Firm* — Calvin B. Ward

(57) ABSTRACT

A concentrating solar collector that includes a target, a plurality of mirror assemblies, and a master tracking assembly that controls the mirror assemblies is disclosed. The mirror assemblies are fixed at a plurality of distinct locations with respect to the target, each mirror assembly includes a moveable mirror and a tracking assembly. Each tracking assembly includes a target member, a sun member, and a tracking actuator. The target member is fixed relative to the target such that the target member points at the target. The sun member is moveable relative to the target such that when the sun member points to the sun, light from the sun is reflected onto the target. The master tracking assembly moves each of the sun members such that the sun members simultaneously point at the sun. The tracking actuators are mechanical devices that are coupled to the master tracking assembly by a mechanical linkage.

17 Claims, 13 Drawing Sheets

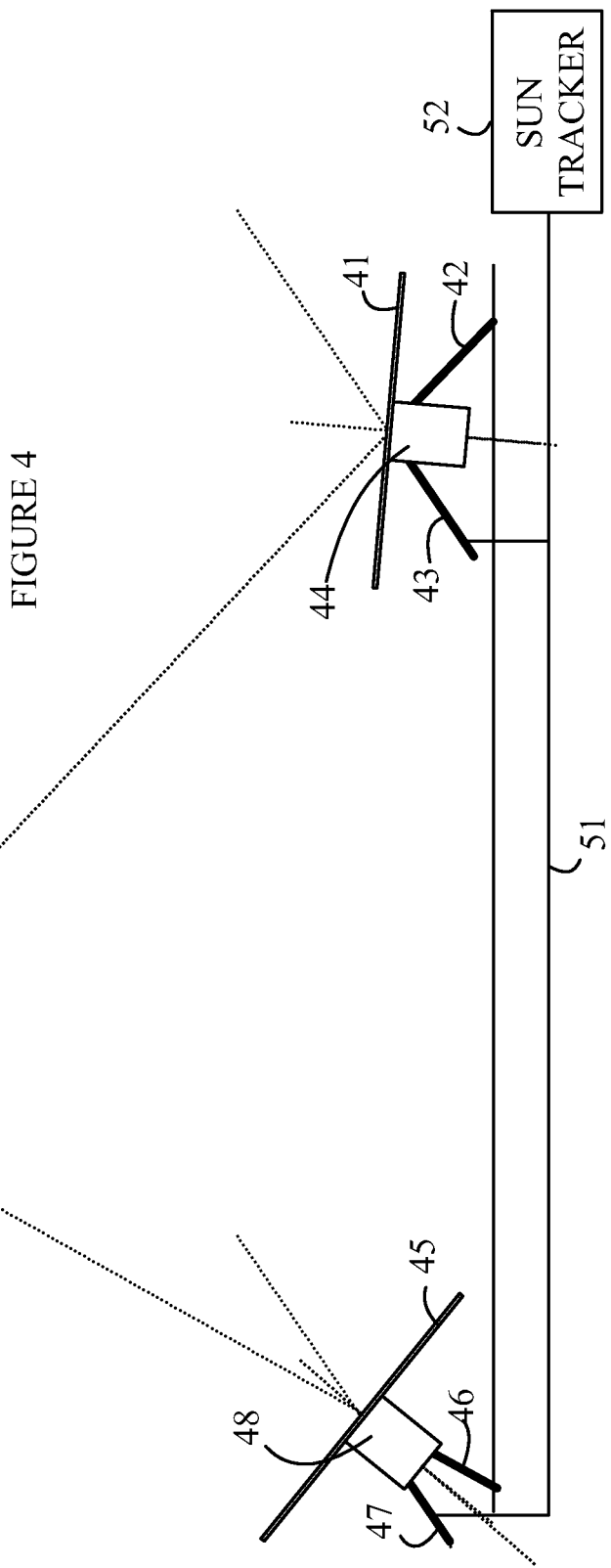

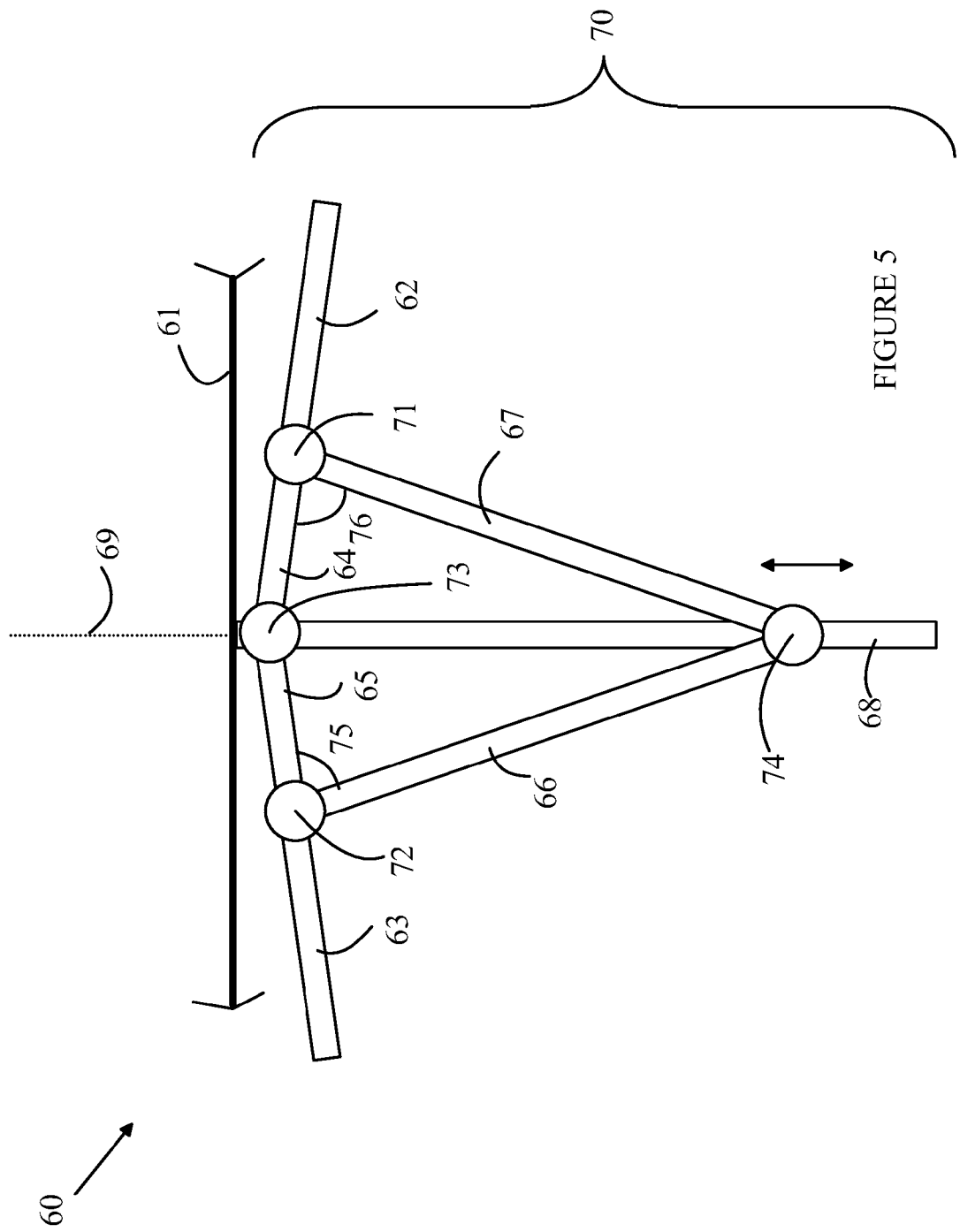

TRACKING SOLAR MIRROR SYSTEM

BACKGROUND

Power generation via solar systems that utilize heliostats or similar arrangements provide substantial advantages for very large scale power plants and for applications that require heat rather than electricity. A common form of heliostat utilizes a large number of planar mirrors that direct sunlight onto a common target. The heat can then be used to operate heat engines that generate electricity or the energy can be stored for later use when the sun is not shining.

A substantial fraction of the costs of a heliostat resides in the cost of the mirrors. There is a tradeoff between the size of a mirror and the cost of the mirror. Each mirror must be individually and continuously positioned relative to the target as the sun moves across the sky. The positioning mechanisms contribute substantially to the cost of each mirror; hence, large mirrors are preferred, since fewer positioning mechanisms are required to provide a predetermined amount of heat at the target. However, as the size of a mirror is increased, the mechanical stresses on the mirror and the positioning mechanism resulting from wind loading also increase. These stresses also result in higher structural costs for the mirror frames as well as higher costs for the positioning mechanism, which must now operate against the wind loading. As a result, heliostats are limited to mirrors that are less than 50 ft$^2$.

SUMMARY

The present invention includes a concentrating solar collector that includes a target, a plurality of mirror assemblies, and a master tracking assembly that controls the mirror assemblies. The mirror assemblies are fixed at a plurality of distinct locations with respect to the target, each mirror assembly includes a moveable mirror and a tracking assembly. Each tracking assembly includes a target member, a sun member, and a tracking actuator. The target member is fixed relative to the target such that the target member points at the target. The sun member is moveable relative to the target such that when the sun member points to the sun, light from the sun is reflected onto the target. The master tracking assembly moves each of the sun members such that the sun members simultaneously point at the sun. The tracking actuators are mechanical devices that are coupled to the master tracking assembly by a mechanical linkage.

BRIEF DESCRIPTION OF THE DRAWINGS

FIG. 4 illustrates two mirror assemblies according to the present invention in a solar concentrating array.

FIG. 5 illustrates one embodiment of a positioning actuator according to the present invention.

DETAILED DESCRIPTION OF PREFERRED EMBODIMENTS

Figure 1:
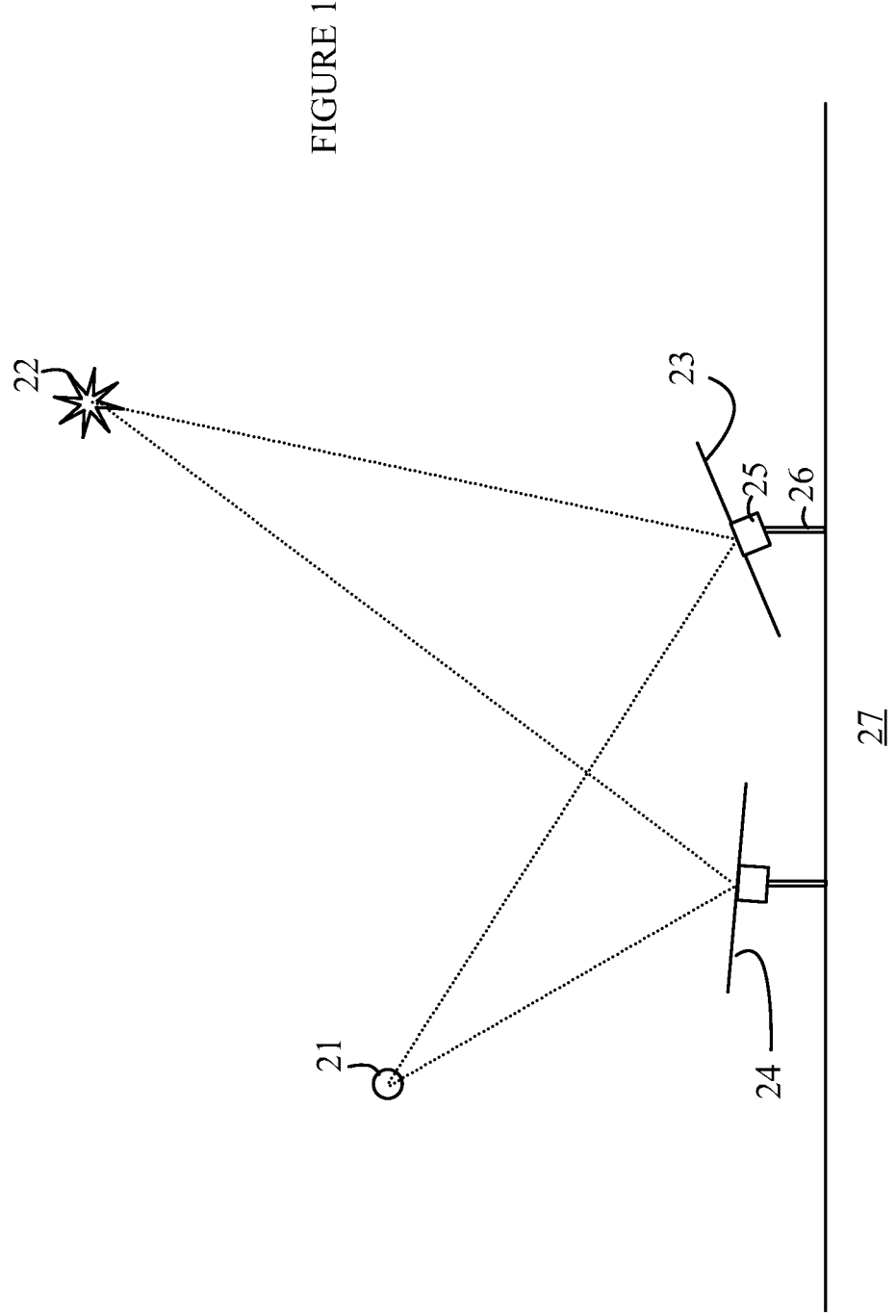
FIG. 1 illustrates two mirrors in a heliostat.

The present invention is based on the observation that the cost of a heliostat mirror could be substantially reduced if a common controller could be used to position a plurality of mirrors without the need for electromechanical actuators that can accurately position each mirror individually. The manner in which the present invention provides its advantages can be more easily understood with reference to FIG. 1, which illustrates two mirrors in a heliostat. Mirrors 23 and 24 are positioned to image the sun shown at 22 onto target 21. Each mirror includes an actuator 25 that positions the mirror such that the light striking that mirror from sun 22 is reflected onto target 21. The actuator is connected to a structure 26 that is anchored in the ground 27.

To simplify the following discussion, it will be assumed that the mirrors are planar. However, the present invention could also be utilized with other types of mirrors. Consider the normal to the mirror's surface. The mirror will be correctly positioned when the target, sun, and mirror normal lie in the same plane and when the angle between the sun and the normal to the mirror is equal to the angle between the target and the normal. It should be noted that this plane changes as the sun moves across the sky, and hence, actuator 25 must position the mirror in two dimensions.

Figure 2:
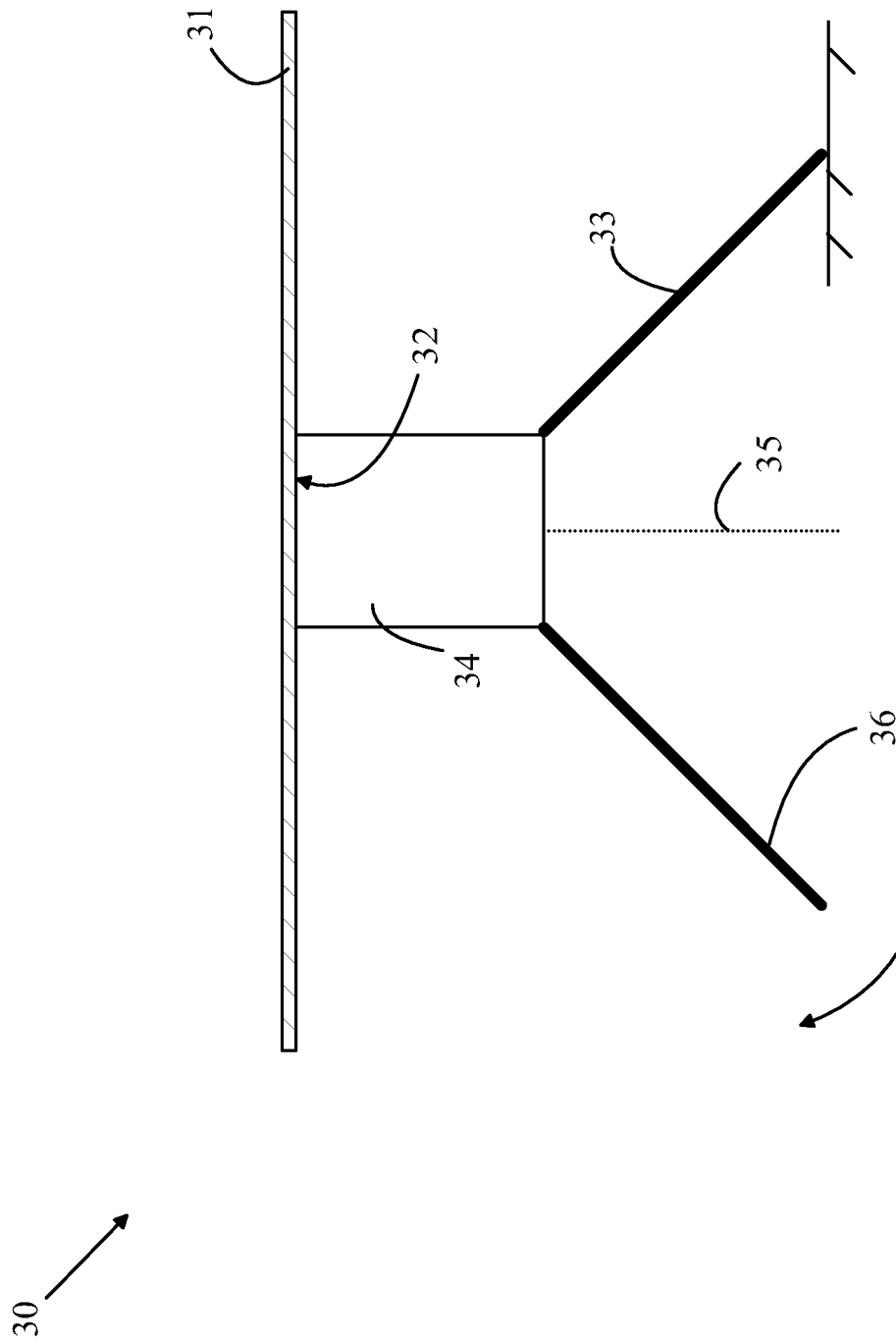
FIG. 2 illustrates one embodiment of a mirror assembly according to the present invention.

Refer now to FIG. 2, which illustrates one embodiment of a mirror assembly according to the present invention. Mirror assembly 30 includes a mirror 31 and a positioning actuator 34 having a mounting surface 32 on which mirror 31 is attached. Positioning actuator 34 includes a fixed member 33 that is fixed relative to the earth and points in the direction of the target. Member 33 will be referred to as the target member in the following discussion. Mirror assembly also includes a member 36 that is moveable with respect to member 33. This member will be referred to as the sun member in the following discussion as this member points to the sun. Positioning actuator 34 is constructed such that when sun member 36 is pointing toward the sun, the angle between sun member 36 and the normal to the surface of mirror 31, which is shown at 35, is equal to the angle between target member 33 and normal 35. Hence, if a mechanism is provided for moving sun member 36 so that sun member 36 remains pointed at the sun as the sun moves during the day, mirror 31 will direct the sunlight onto the target.

Figure 3B:
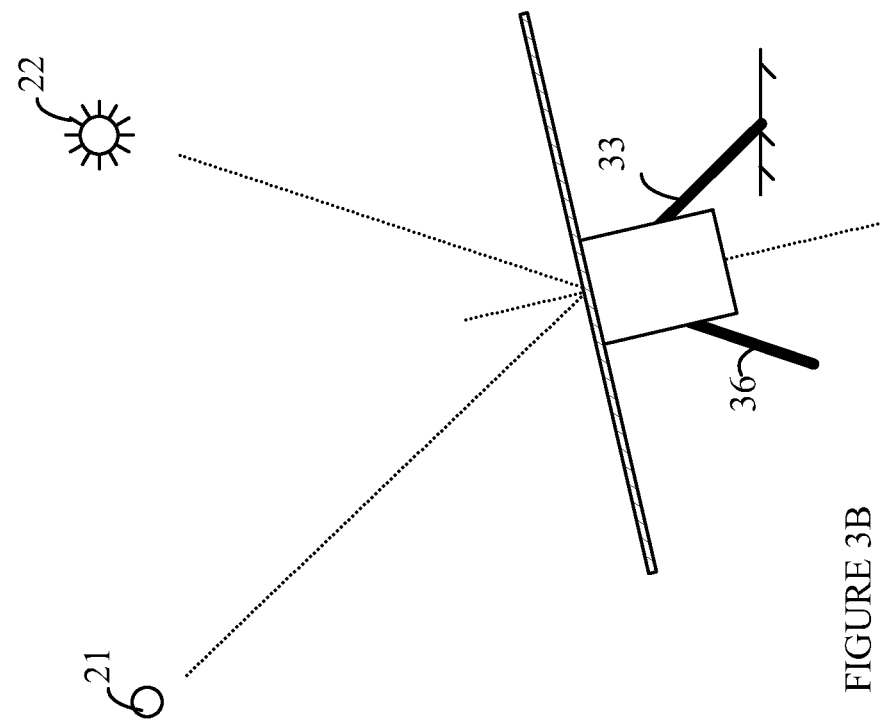
FIGS. 3A-3C illustrate the tracking of the sun by one mirror assembly.
Figure 3A:
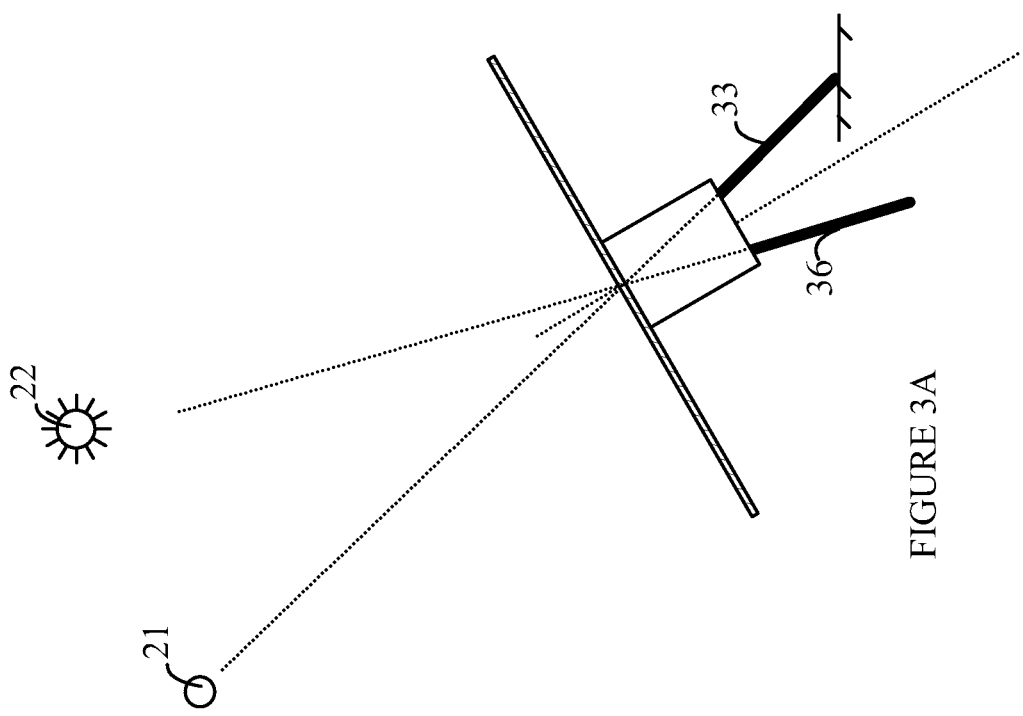
Figure 3C:
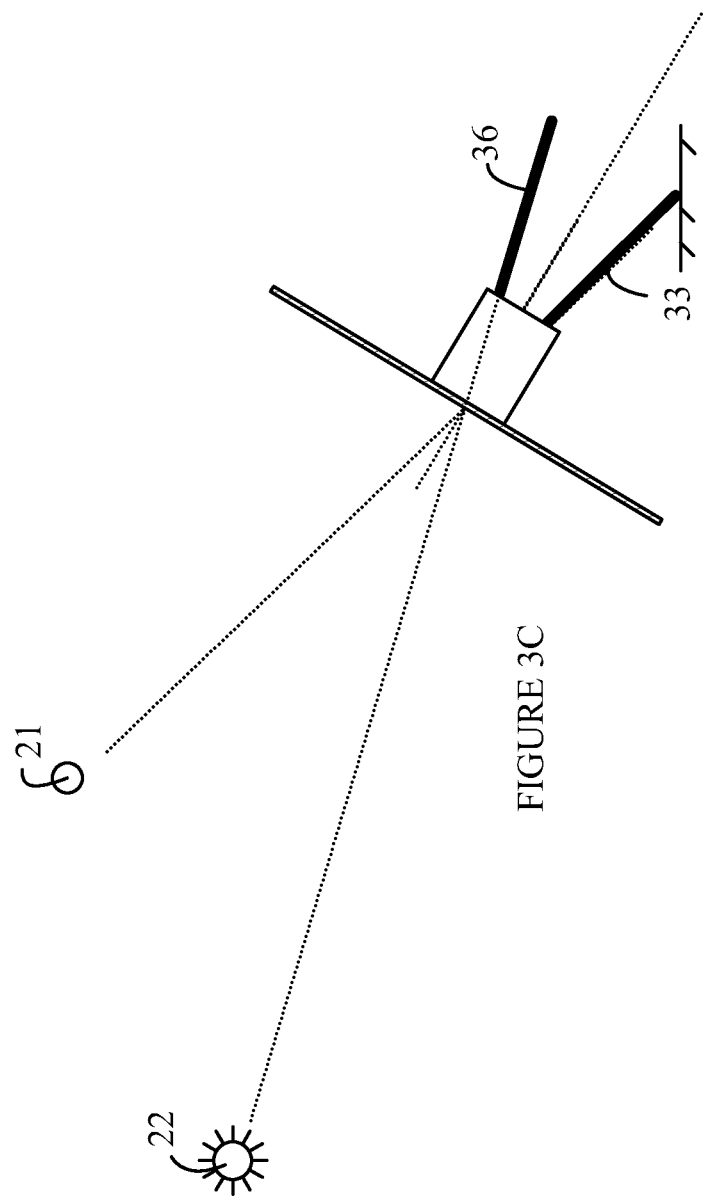

Refer now to FIGS. 3A-3C, which illustrate the tracking of the sun by one mirror assembly. FIGS. 3A-3B illustrate configurations in which the sun 22 is on one side of target 21. FIG. 3C illustrates a configuration in which the sun 22 is on the other side of target 21. It should be noted that the sun member must move past the target member as the sun moves from one side of the target to the other. This requirement poses structural challenges with respect to the position actuator. These challenges will be discussed in more detail below with respect to various embodiments of the position actuator.

Refer now to FIG. 4, which illustrates two mirror assemblies according to the present invention in a solar concentrating array. Mirror assembly 41 includes a target member 42 that points toward target 21 and is fixed in space. Mirror assembly 41 also includes a sun member 43 and a position actuator 44. Sun member 43 is connected to a linkage 51 which moves in a manner that causes sun member 43 to point to the sun, which is omitted from this drawing for reasons discussed below. Similarly, mirror assembly 45 includes a target member 46 that points toward target 21 and is fixed in space. Mirror assembly 45 also includes a sun member 47 and a position actuator 48. Sun member 43 is also connected to linkage 51. Linkage 51 is controlled from sun tracker 52 that moves linkage 51 in a manner that causes all of the sun members attached to linkage 51 to move together and point toward the sun.

It should be noted that the position of the sun in the figures discussed above is greatly exaggerated relative to the position of the target. In reality, the sun is so far from the mirror assemblies and target, that the radiation from the sun over the entire area of the concentrating array can be treated as a collimated light beam in which all of the light rays are parallel with respect to one another. As a result, the sun member in each mirror assembly points in the same direction as the sun member in the other mirror assemblies. Hence, the sun members can be rigidly connected together. As a result, the only electromechanical actuator is that in sun tracker 52 that moves linkage 51.

Refer now to FIG. 5, which illustrates one embodiment of a positioning actuator according to the present invention. Mirror assembly 60 includes a mirror 61 and a position actuator 70 that adjusts the position of mirror 61. Position actuator 70 is constructed from the five members shown at 64-68 that are joined by the four joints shown at 71-74. The five members lie in a plane that will be referred to as the actuator plane in the following discussion. Members 64-67 being connected to member 68 at one end of each of member. Joints 71-72 are hinge joints. Joint 74 includes two hinge points attached to a sliding joint that can move along member 68. Mirror 61 is mounted such that the normal to mirror 61 shown at 69 is parallel to the axis of member 68. Member 66 is the same length as member 67. Similarly, members 64 and 65 have the same length, and angles 75 and 76 are equal to one another.

In the following discussion the structure defined by members 64-67 and joints 71-74 will be defined to be a "kite" structure. Members 64-67 will be referred to as the first, second, third, and fourth members of the kite structure, respectively. In a kite structure, members 66 and 67 have the same length, and members 64 and 65 have the same length. In this embodiment, members 64-67 remain in the same plane. Joints 73 and 74 are constrained to move toward or away from one another along a line, referred to as the center line of the kite structure in the following discussion. In the case of the kite structure shown in FIG. 5, this constraint is provided by member 68 which defines the kite center line. However, as will be explained in more detail, other arrangements for confining the motion can be utilized.

Member 64 includes target member 62, which is an extension of member 64. Target member 62 is fixed to a location that is determined by the respective positions of the target and the mirror assembly in the mirror array. Member 65 includes sun member 63, which is an extension of member 65. Sun member 63 is attached to the linkage that moves to maintain the position of the mirror such that the sun's light is reflected onto the target.

Figure 6:
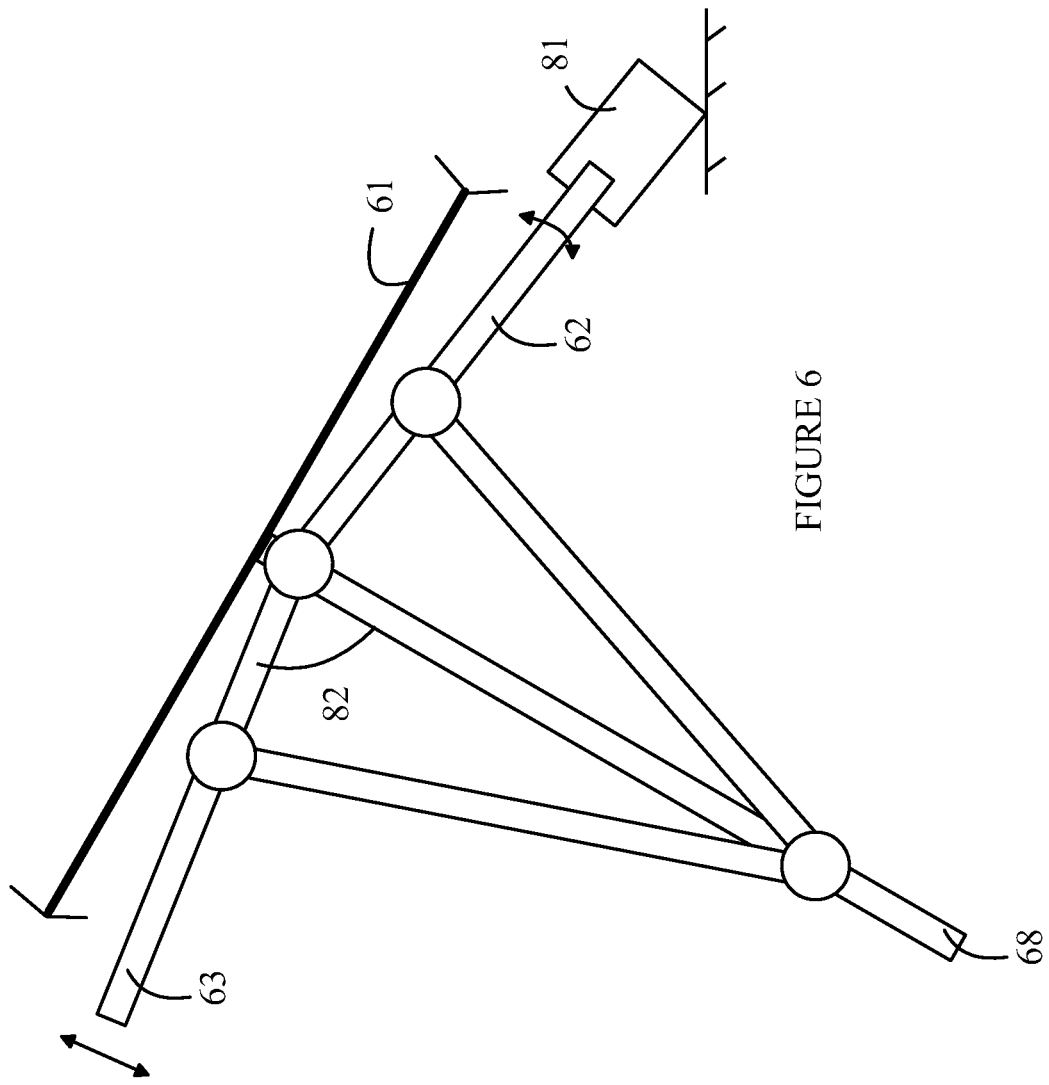
FIG. 6 illustrates another embodiment of a positioning assembly according to the present invention.

The target and the sun must also lie in the actuator plane of position actuator 70. Hence, some mechanism is needed to rotate the plane of position actuator 70 as the sun moves across the sky if position actuator 70 is to provide ideal tracking during the entire day. Refer now to FIG. 6, which illustrates another embodiment of a positioning assembly according to the present invention. To provide the extra degree of freedom needed to track the sun, target member 62 is mounted in a rotational coupling 81 which allows the actuator plane to be rotated while maintaining the direction in which target member 62 points so that target member 62 remains pointed at the target while the actuator plane is rotated. The rotation of target member 62 is set such that the plane defined by the target, the sun, and target member 62 also includes member 68.

The above-described embodiments of a positioning actuator, however, have limitations that render the embodiments less than ideal. First, the range of sun positions that can be accommodated by moving the sun pointer is limited by the allowable range of motion of sun member 63. To attain all of the desired positions, angle 82 must be varied from 0 to 90 degrees. However, the finite dimensions of the members and limitations of the joints will still not allow angle 82 to attain all angles between 0 and 90 degrees, particularly for angles near zero. Hence, there will be some positions in which the tracking mechanism will not provide the desired reflections of the sun. The extent to which these limitations provide problems will depend on the details of the mirror array. In addition, rotational coupling 81 increases the cost of the positioning actuator. Finally, the linkages to the mechanism for moving the sun pointers in unison present challenges if the sun pointers are under the mirror.

Figure 7:
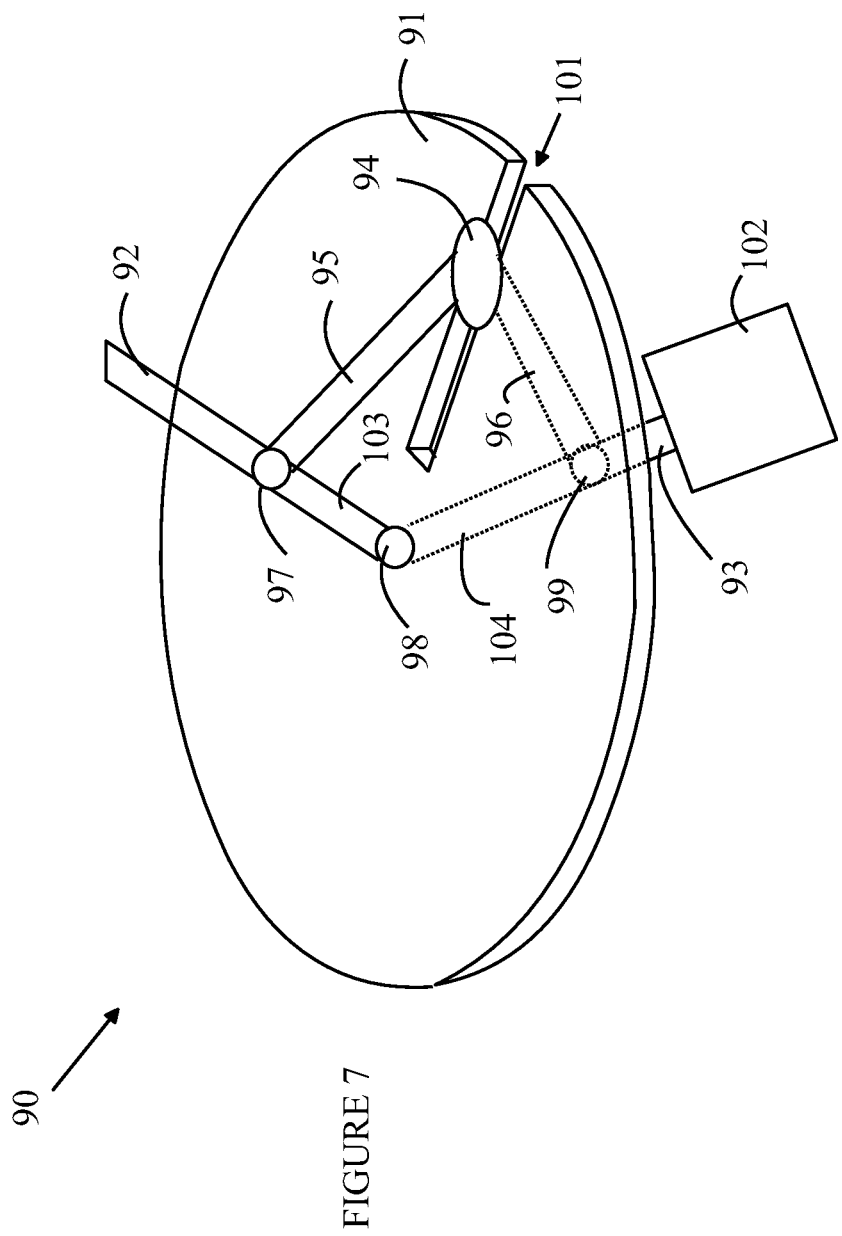
FIG. 7 illustrates another embodiment of a mirror assembly according to the present invention.

Refer now to FIG. 7, which illustrates another embodiment of a mirror assembly 90 according to the present invention. This embodiment can be viewed as a kite structure consisting of members 95, 96, 103, and 104. The motion of joints 94 and 98 is constrained by slot 101 in mirror 91. In this case, slot 101 is the kite center line. In this embodiment, mirror 91 also acts as the motion constraining member of the kite structure. The actuator mechanism includes member 92 that functions as the sun member and member 93 which functions as the target member. Member 93 is fixed in a rotating adapter 102 in a manner analogous to that discussed above. Members 95 and 96 are analogous to members 66 and 67 discussed above with reference to FIG. 5. Members 95 and 96 connect to a sliding joint 94 which moves in slot 101 as the position of the sun member is changed. Joints 97, 98, and 99 are analogous to joints 71-73 shown in FIG. 5. Since the sun member is now above the mirror, the problems discussed above with respect to connecting the sun member to a common linkage are substantially reduced.

Figure 8:
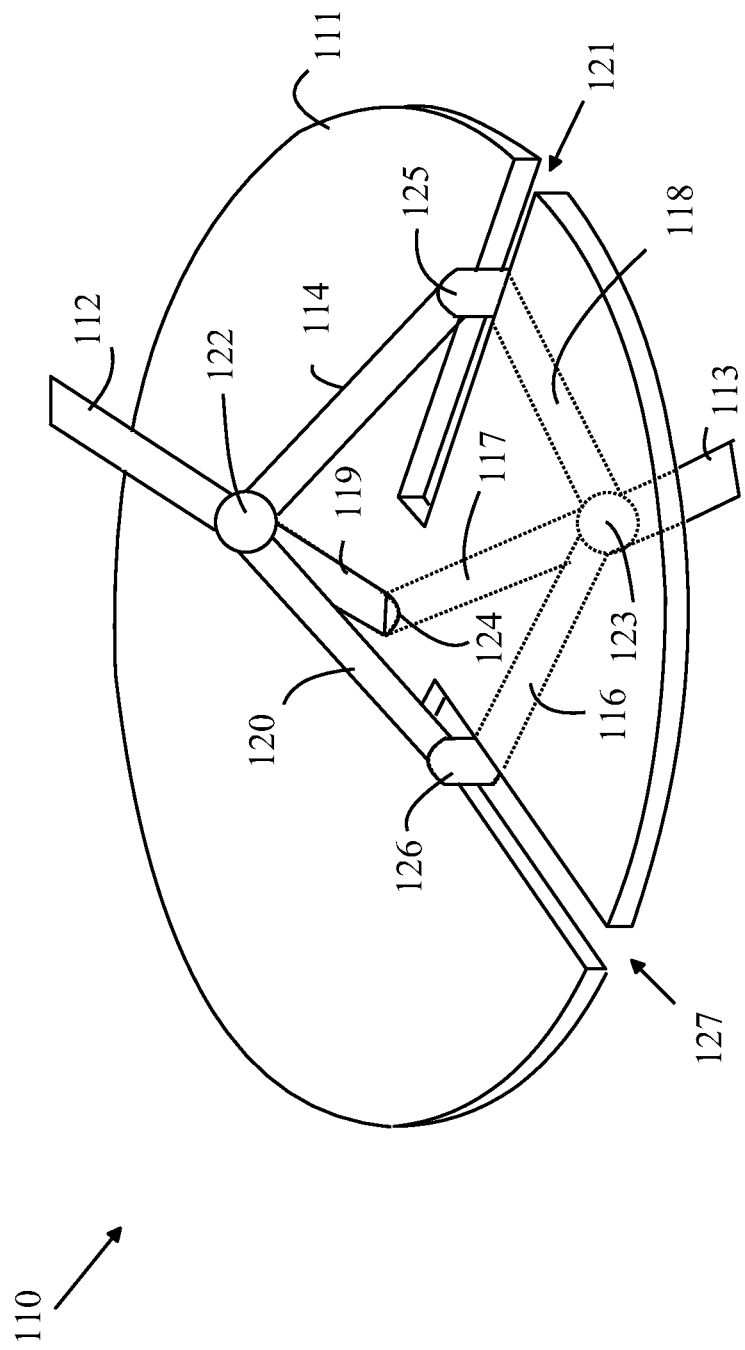
FIG. 8 illustrates a mirror assembly according to another embodiment of the present invention.

As noted above, embodiments in which the target member does not need to rotate would be advantageous. Refer now to FIG. 8, which illustrates a mirror assembly 110 according to another embodiment of the present invention. The position actuator in mirror assembly 110 can be viewed as consisting of two kite structures that share two members and a mirror 111. The first kite structure includes members 120, 116, 117, and 119. The second kite structure includes members 114, 118, 117, and 119. The slideable joint of the first kite structure is shown at 126 and moves in slot 127 that is cut in mirror 111. The slideable joint of the second kite structure is shown at 125 and moves in slot 121. Slots 121 and 127 are the center lines of the two kite structures, respectively. In this case, the mirror lies in the plane defined by the center lines of the two kite structures. An extension 113 of member 117 is fixed so that member 117 points at the target. An extension 112 of member 119 is attached to the positioning mechanism, which moves member 119 such that member 119 points at the sun. It should be noted that member 117 does not rotate while the sun member tracks the sun. It should be noted that joints 122, 123, and 124 are hinge joints. Since hinge joints are relatively inexpensive, the cost of mirror assembly 110 can be significantly less than mirror assembly 90 discussed above.

Figure 9:
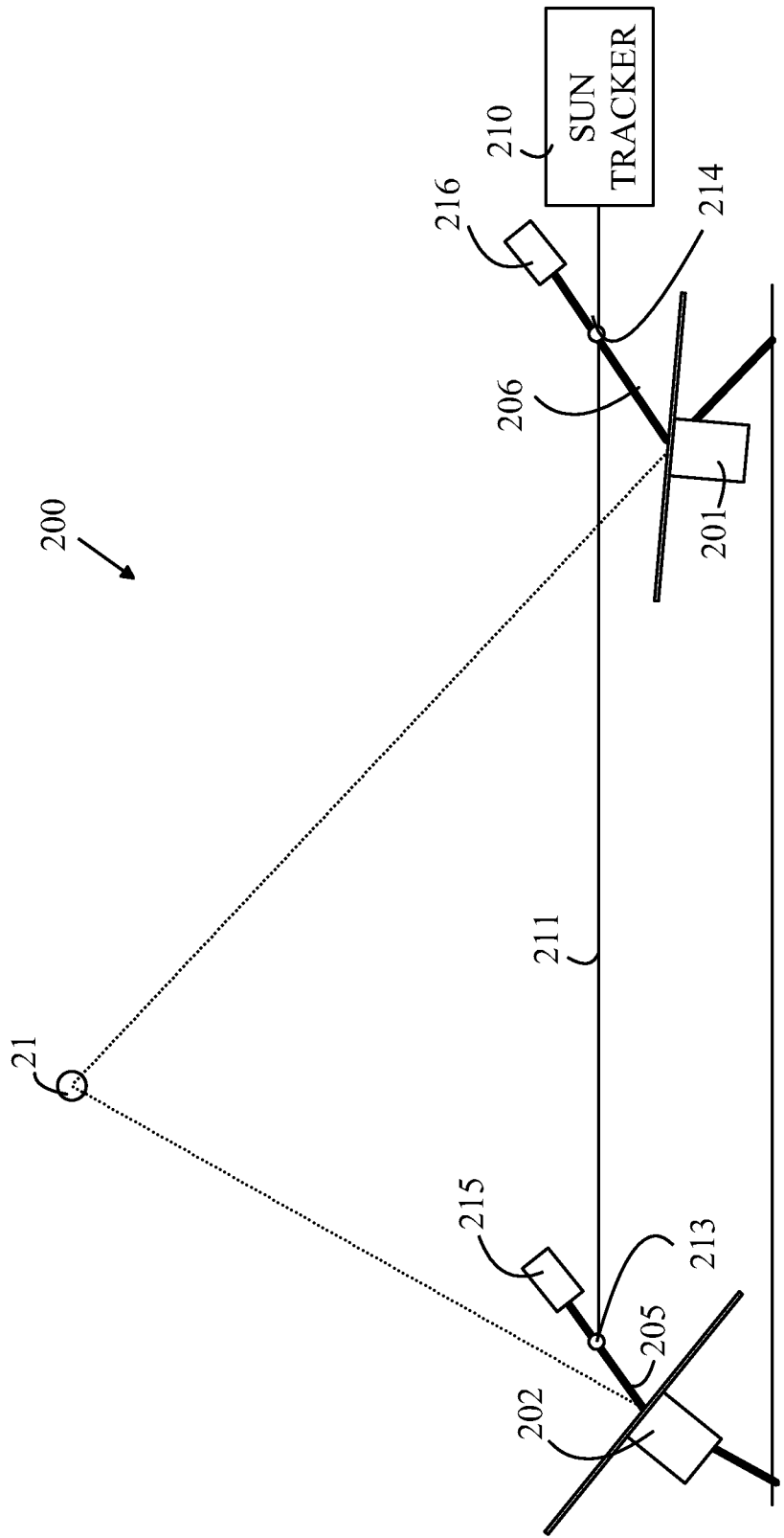
FIG. 9 illustrates another embodiment of a solar concentrating system according to the present invention.

As noted above, the sun members move in parallel such that each sun member points towards the sun. Refer now to FIG. 9, which illustrates another embodiment of a solar concentrating system according to the present invention. Concentrator 200 utilizes mirror assemblies in which the sun member is on the same side of the mirror as the sun. Exemplary mirror assemblies are shown at 201 and 202. The sun members corresponding to these mirror assemblies are shown at 205 and 206, respectively. The sun members are attached to a mechanical linkage 211 via joints 213 and 214. Sun tracker 210 moves the sun members together so that each of the sun members points towards the sun.

In this embodiment, sun tracker 210 tracks the sun continuously using solar position detectors 215 and 216. Such solar position detectors are well known in the art and hence will not be described in detail here. It is sufficient to note that solar position detectors typically include a lens for imaging the sun onto a detector in which the position of the sun on the detector can be determined. Sun tracker 210 moves mechanical linkage 211 such that the position of the sun on the detector remains constant. In principle, a single solar position detector would be sufficient to determine the position of the sun. However, there will be positions of the sun in which target 21 eclipses the sun as seen from any single solar position detector. Hence a second solar position detector is provided at a location such that at least one of the solar trackers can view the sun at all times.

Additional solar position detectors also provide a means for detecting errors in the alignment of the arrays. If a solar position detector is provided for each mirror assembly, and the output of that solar position detector is provided to sun tracker 210, any significant discrepancy in the outputs of the solar position detectors can be used to identify mirror assemblies that are not functioning properly.

In the embodiment shown in FIG. 9, the solar position detectors are used to provide position information to sun tracker 210 so that sun tracker 210 can continuously follow the sun's position in the sky. However, it should be noted that once the mirror assemblies are fixed relative to target 21 such that the target members are properly aligned, the position of the sun can then be tabulated and stored in sun tracker 210. In this case, the issues related to the target eclipsing the sun are no longer relevant. In addition, the tracking system will continue to operate properly even if the sun is obscured by clouds during part of the day. However, it still may be useful to include the solar position trackers on a plurality of mirror assemblies to provide diagnostic information with respect to the functioning sun tracker 210, and the linkages connecting the mirror assemblies.

Figure 10:
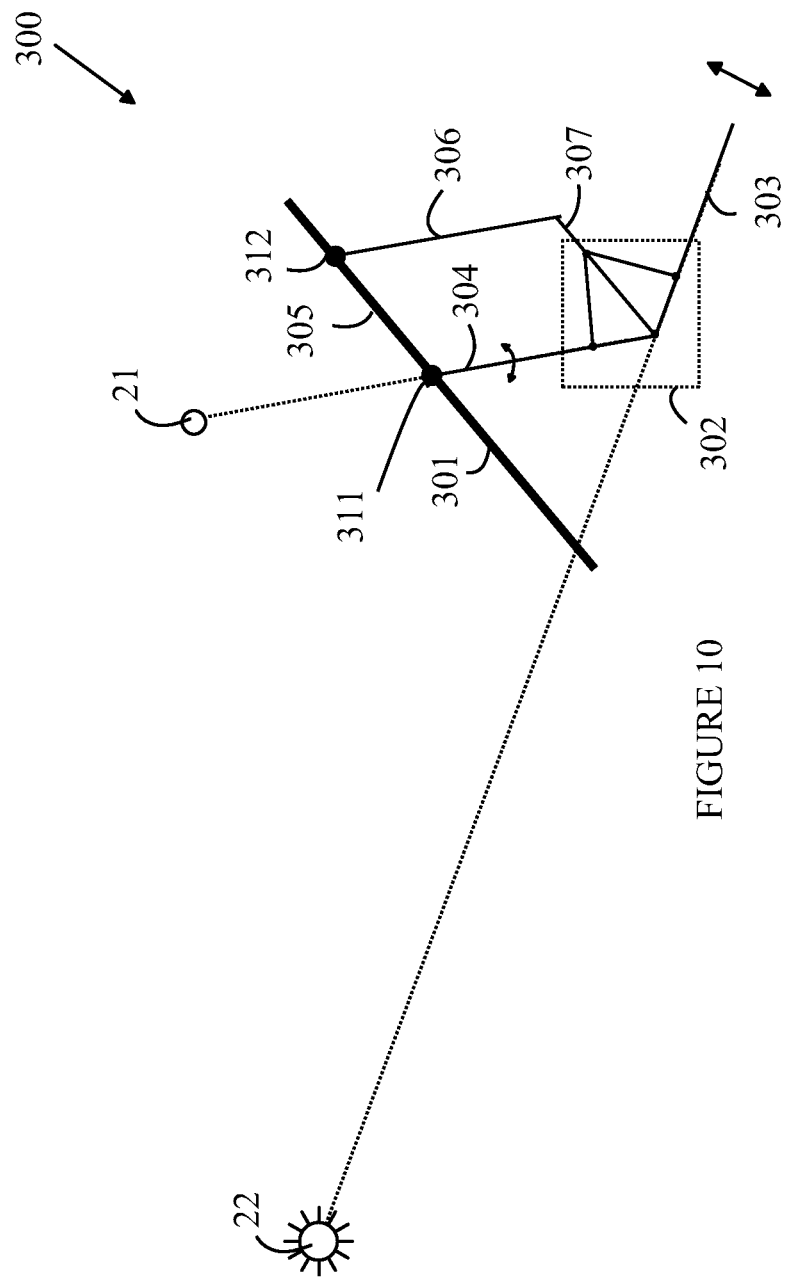
FIG. 10 illustrates another embodiment of a mirror assembly according to the present invention.

In the above-described embodiments, the mirror was connected to the center member of the kite structure such that the center line of the kite structure(s) is in the plane of the mirror. However, other arrangements could be utilized. Refer now to FIG. 10, which illustrates another embodiment of a mirror assembly according to the present invention. Mirror assembly 300 includes a mirror 301 that is connected to a target member 304 of a kite structure 302 by a hinge 311. Mirror 301 is also connected to the center member of kite structure 302 by a link 306 that is connected to a second location on mirror 301 by a hinge 312. It should be noted that target members 304-307 form a parallelogram that moves when sun member 303 moves to track the sun. To provide two-dimensional tracking, the kite structure and parallelogram are rotated about the axis defined by target member 304. In this case, the plane of the mirror is parallel to the center line of the kite structure but does not include the center line of the kite structure.

Mirror assembly 300 provides two improvements over mirror assembly 90 discussed above. First, mirror assembly 300 does not require a slot in the mirror. This reduces the cost of the mirror and strengthens the mirror. Second, the sun pointer and associated linkages are on the opposite side of the mirror from the sun, and hence, optical losses from the shadows of these elements are avoided.

Figure 11:
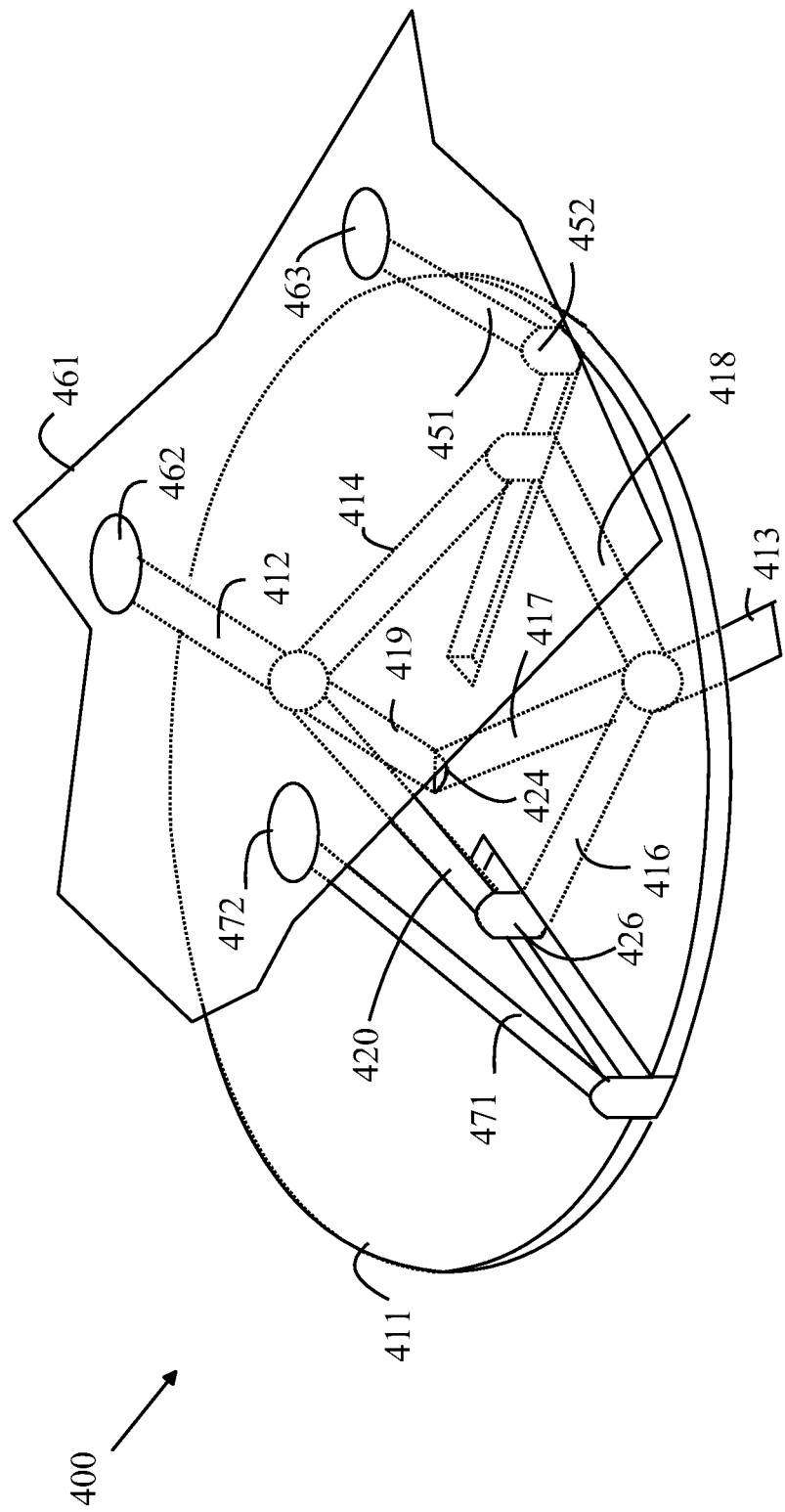
FIG. 11 illustrates yet another embodiment of a mirror assembly according to the present invention.

Refer now to FIG. 11, which illustrates another embodiment of a mirror assembly according to the present invention. Mirror assembly 400 also utilizes an arrangement in which the mirror is mounted on an extension of the target pointer. Mirror assembly 400 is similar to mirror assembly 100 discussed above with reference to FIG. 8 in that mirror assembly 400 utilizes two kite structures so that two dimensional tracking can be provided without requiring that the target member rotate about an axis through the target member.

Referring to FIG. 11, mirror assembly 400 includes a first kite structure having arms 414, 419, 417, and 418. Arms 417 and 419 are connected by hinge 424. The second kite structure shares arms 417 and 419. Arms 416, and 420, complete the second kite structure. Arms 416 and 420 are connected by a hinge 426 that moves in a slot in disk 411. Similarly, arms 414 and 418 are connected by a hinge that moves in another slot in disk 411. In this embodiment, the target pointer is arm 419 that is hingedly connected to the mirror 461 by an extension 412 and hinge 462. Two additional arms shown at 471 and 451 are connected by joints 472 and 463 such that the plane of mirror 461 remains parallel to the plane defined by the center lines of the two kite structures as the mirror assembly is moved to track the sun.

The mirror connections operate in a manner analogous to that shown in FIG. 10 and form a similar parallelogram. The plane of disk 411 is parallel to the plane of mirror 461. The distance between hinges 462 and 463 is the same as the distance between hinges 452 and 424. Arm 451 has a length equal to the distance between hinge 424 and hinge 462.

The sun member in this embodiment is arm 417, which is moved by moving extension 413 in a manner analogous to that discussed above. The linkages for moving arm 417 can be positioned on the opposite side of the mirror from the sun, and hence, shading of the mirror by the mechanism that moves extension 413 as well as shading of the mirror by extension 413 itself is avoided.

The above-described embodiments of the invention utilize planar mirrors; however, other forms of mirrors could be advantageously utilized. Planar mirrors are less expensive to manufacture; however, such mirrors require a target that is at least as large as the largest planar mirror in the array. Since the target is required to operate at very high temperatures in many applications, the cost savings achieved by utilizing planar mirrors can be substantially reduced by the increased costs of a large target.

Arrays based on parabolic mirrors having long focal lengths have the advantage of requiring substantially smaller targets. The present invention facilitates designs in which a large number of mirrors can be utilized. The individual mirrors can be mass-produced using conventional plastic molding techniques, and hence, the increased costs of the parabolic mirrors relative to planar mirrors is significantly reduced.

The manner in which the present invention operates with non-planar mirrors can be more easily understood in terms of the relationship of the axis of the mirror relative to the center line of the kite structures in the tracking assemblies. For the purpose of this discussion, the axis of a mirror is defined to be the normal to the surface of the mirror at the center of the mirror.

Figure 12:
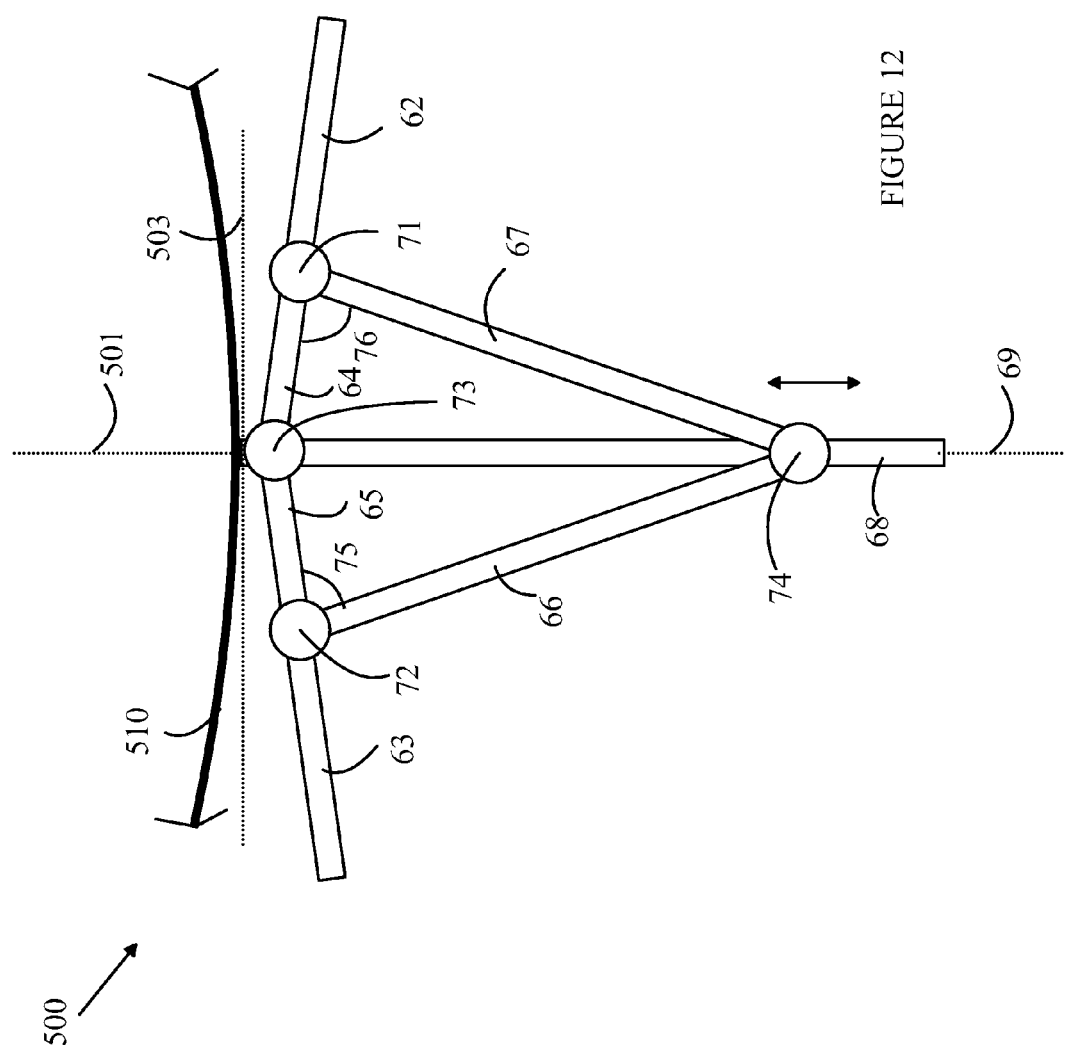
FIG. 12 illustrates another embodiment of a mirror assembly according to the present invention.

Refer now to FIG. 12, which illustrates an embodiment of a mirror assembly according to the present invention that utilizes a parabolic mirror. For the purpose of this discussion, a parabolic mirror is defined to be a non-planar mirror having a shape determined by a parabola that is rotated about the axis of the mirror. To simplify the discussion, those elements of mirror assembly 500 that serve functions analogous to elements of mirror assembly 60 shown in FIG. 5 have been given the same numeric designations and will not be discussed in detail here. Mirror assembly 500 utilizes a parabolic mirror 510 whose axis is shown at 501. Mirror axis 501 is perpendicular to a tangent 503 to the mirror surface at the center of the mirror. The center line of the kite structure is shown at 69. It will be apparent from the drawing that the axis of the mirror is parallel to the center line of the kite structure, or perpendicular to the tangent to the mirror surface at the center of the mirror, in this embodiment and displaced from the plane defined by the center lines of the kite structures.

In embodiments in which the two kite structures are utilized such as the embodiments shown in FIGS. 8 and 11, the axis of the mirror is perpendicular to the plane defined by the center lines of the two kite structures. It should be noted the axis of a planar mirror can also be defined in this manner and the embodiments shown with planar mirrors also satisfy similar constraints.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A concentrating solar collector comprising:
    a target;
    a plurality of mirror assemblies fixed at a plurality of distinct locations with respect to said target, each mirror assembly comprising a moveable mirror and a tracking assembly; and
    a master tracking assembly that controls said mirror assemblies,
    wherein each tracking assembly comprises a target member, a sun member, and a tracking actuator, said target member being fixed relative to said target and said sun member being moveable relative to said target such that when said sun member points to the sun, light from the sun is reflected onto said target, and
    wherein said master tracking assembly moves each of said sun members such that said sun members simultaneously point at the sun, and
    wherein said tracking actuator in one of said mirror assemblies comprises a first kite structure characterized by first, second, third, and fourth members and a center line, first member of said first kite structure being said sun member and a second member of said first kite structure being said target member.

2. The concentrating solar collector of claim 1 wherein said target member in one of said tracking assemblies comprises a member that points at said target.

3. The concentrating solar collector of claim 1 wherein said master tracking assembly comprises a rigid linkage connected to each of said sun members, said sun members being parallel to one another when so connected to said linkage.

4. The concentrating solar collector of claim 1 wherein said tracking actuator in said one of said mirror assemblies further comprises a rotational coupling that is fixed relative to said target and positioned such that said second member rotates within said coupling while remaining pointed at said target.

5. The concentrating solar collector of claim 1 wherein said mirror is characterized by an axis and wherein said axis is parallel to said center line.

6. The concentrating solar collector of claim 1 wherein said mirror is characterized by an axis and wherein said axis is perpendicular to said center line.

7. The concentrating solar collector of claim 1 wherein said mirror comprises a parabolic mirror.

8. The concentrating solar collector of claim 1 wherein said first member is on one side of said mirror in said one of said mirror assemblies and said second member is on the other side of said mirror.

9. The concentrating solar collector of claim 8 wherein said mirror comprises a slot, one of said joints in said first kite structure being constrained to slide in said slot.

10. The concentrating solar collector of claim 1 wherein said tracking actuator in said one of said mirror assemblies comprises a second kite structure, said second kite structure sharing said first and second members of said first kite structure.

11. The concentrating solar collector of claim 10 wherein said mirror comprises a parabolic mirror characterized by an axis and wherein said axis is perpendicular to said center lines of said first and second kite structures.

12. The concentrating solar collector of claim 1 wherein said mirror comprises a planar mirror and wherein said center line of said first kite structure is parallel to said planar mirror.

13. The concentrating solar collector of claim 12 wherein said planar mirror is between said center line of said first kite structure and said target.

14. The concentrating solar collector of claim 12 wherein said tracking actuator comprises a second kite structure characterized by first, second, third, and fourth members and a center line and wherein said center line of said second kite structure is parallel to said planar mirror.

15. The concentrating solar collector of claim 1 wherein one of said solar members comprises a solar position detector whose output is used by said master tracking assembly.

16. The concentrating solar collector of claim 15 wherein a second one of said solar members comprises a solar position detector, such that said target does not simultaneously eclipse the sun at said first and second ones of said solar members.

17. The concentrating solar collector of claim 1 wherein a plurality of said solar members include solar position detectors, said solar position detectors having outputs that are used by said master tracking assembly to detect positioning errors with respect to said mirrors.

* * * * *